US011165529B2

(12) United States Patent
Yamamoto

(10) Patent No.: US 11,165,529 B2
(45) Date of Patent: Nov. 2, 2021

(54) OPTICAL WAVELENGTH MULTIPLEX TRANSMISSION SYSTEM, OPTICAL WAVELENGTH MULTIPLEX APPARATUS, AND STANDBY SYSTEM CHECKING METHOD

(71) Applicant: NEC Corporation, Tokyo (JP)

(72) Inventor: Tetsuya Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 577 days.

(21) Appl. No.: 16/081,063

(22) PCT Filed: Jan. 23, 2017

(86) PCT No.: PCT/JP2017/002131
§ 371 (c)(1),
(2) Date: Aug. 30, 2018

(87) PCT Pub. No.: WO2017/168994
PCT Pub. Date: Oct. 5, 2017

(65) Prior Publication Data
US 2021/0194616 A1     Jun. 24, 2021

(30) Foreign Application Priority Data

Mar. 29, 2016   (JP) .............................. JP2016-065601

(51) Int. Cl.
*H04B 10/032* (2013.01)
*H04J 14/02* (2006.01)
*H04B 10/07* (2013.01)

(52) U.S. Cl.
CPC .............. *H04J 14/02* (2013.01); *H04B 10/07* (2013.01); *H04J 2203/0062* (2013.01)

(58) Field of Classification Search
CPC ........................... H04J 14/0287; H04B 10/032
See application file for complete search history.

(56) References Cited

U.S. PATENT DOCUMENTS

2002/0105693 A1   8/2002  Kobayashi et al.
2003/0123785 A1*  7/2003  Sugitani ............. H04Q 11/0005
                                                385/16
(Continued)

FOREIGN PATENT DOCUMENTS

CN        101562480 A   10/2009
CN        103178971 A    6/2013
(Continued)

OTHER PUBLICATIONS

Japanese Office Action for JP Application No. 2018-508435 dated Feb. 25, 2020 with English Translation.
(Continued)

*Primary Examiner* — Shi K Li
(74) *Attorney, Agent, or Firm* — Sughrue Mion, PLLC

(57) ABSTRACT

An optical wavelength multiplex transmission system includes a redundant configuration composed of an active system and a standby system between a first terminal station apparatus and a second terminal station apparatus. The first terminal station apparatus includes a light source configured to output dummy light, a coupler configured to insert the dummy light into the standby system, and a control unit configured to vary the dummy light. The second terminal station apparatus includes a coupler configured to extract the dummy light from the standby system and a detector configured to detect the extracted dummy light. The optical wavelength multiplex transmission system can identify a route of the standby system between the first terminal station apparatus and the second terminal station apparatus according to a result of the detection by the detector and check whether the standby system is normal.

17 Claims, 4 Drawing Sheets

(56) References Cited

U.S. PATENT DOCUMENTS

2005/0180316 A1\* 8/2005 Chan .................. H04J 14/0291
370/216
2014/0321845 A1 10/2014 Jiang et al.

FOREIGN PATENT DOCUMENTS

| CN | 104954065 A | 9/2015 |
|----|-------------|--------|
| EP | 1324630 A2 | 7/2003 |
| JP | H09-312614 A | 12/1997 |
| JP | 2003-318828 A | 11/2003 |
| JP | 2006-196938 A | 7/2006 |
| JP | 2006-229523 A | 8/2006 |
| JP | 2014-175917 A | 9/2014 |
| WO | 01/35582 A1 | 5/2001 |
| WO | 2014/010151 A1 | 1/2014 |

OTHER PUBLICATIONS

International Search Report for PCT Application No. PCT/JP2017/002131, dated Mar. 7, 2017.
Extended European Search Report for EP Application No. EP17773544.6 dated Nov. 8, 2019.
Chinese Office Action for CN Application No. 201780017706.0 dated Jul. 27, 2020 with English Translation.

\* cited by examiner

OPTICAL WAVELENGTH MULTIPLEX TRANSMISSION SYSTEM, OPTICAL WAVELENGTH MULTIPLEX APPARATUS, AND STANDBY SYSTEM CHECKING METHOD This application is a National Stage Entry of PCT/JP2017/002131 filed on Jan. 23, 2017, which claims priority from Japanese Patent Application 2016-065601 filed on Mar. 29, 2016, the contents of all of which are incorporated herein by reference, in their entirety.

TECHNICAL FIELD

The present invention relates to an optical wavelength multiplex transmission system, an optical wavelength multiplex apparatus used in an optical wavelength multiplex transmission system, and a standby system checking method in an optical wavelength multiplex transmission system.

BACKGROUND ART

In recent years, services handling large volume contents such as videos have been rapidly expanding along with the spread of the Internet and the like, and the capacity of a backbone network has also been increasing to transmit the large volume contents. Such a network is commonly configured as an optical wavelength multiplex transmission system that connects terminal stations by optical fibers and performs wavelength division multiplexing. The optical wavelength multiplex transmission system operates at a high speed with a large capacity and multiple functions. A desired network topology in the optical wavelength multiplex transmission system is changing from the point-to-point direct connection to the ring configuration and the mesh configuration. Along with such complications, an importance of monitoring the transmission paths increases in the optical wavelength multiplex transmission system. Thus, the optical wavelength multiplex transmission system is desired to automatically switch the transmission paths to improve reliability.

One of features of the optical wavelength multiplex transmission system is that it amplifies an optical signal as it is without converting the optical signal into an electric signal at a relay node on the transmission path. For this reason, information such as an error rate for obtaining the quality of the optical line can be obtained only at an end point of the transmission path. Management at the level of obtaining the error rate after converting the optical signal into the electric signal at the end point has sufficed as the monitoring of the transmission path quality. However, in the optical wavelength multiplex transmission system that employs a redundant configuration and the like because of the complicated system, it is necessary to monitor the line quality in each section with the optical signals without converting them into electric signals or to monitor the quality of the lines of the standby system. An optical multiplex transmission apparatus provided in the optical wavelength multiplex transmission system has been diversified along with complicating and highly functionalizing optical wavelength multiplex transmission system. In the diversified optical multiplex transmission system, a spectrum is monitored using an Optical Channel Monitor (OCM), which is one kind of a photodetector, in order to monitor a complicated wavelength arrangement.

There is an optical wavelength multiplex transmission system that has a redundant configuration composed of an active system and a standby system in order to handle failures that can occur on a transmission path, and in the event of a failure in the active system, it automatically switches to the standby system. Such an optical wavelength multiplex transmission system needs constant monitoring about whether a failure is occurring not only on the active system but also on the standby system, because the system is switched from the active system to the standby system based on the premise that no failure is occurring in the standby system. Patent Literature 1 discloses a technique in which when a transmission apparatus inserts dummy light into a standby system, and a reception apparatus detects a failure in an active system, the reception apparatus refers to the dummy light from the standby system to determine whether to switch the system from the active system to the standby system. Patent Literature 2 discloses an optical wavelength multiplex transmission system including a plurality of terminal station apparatuses. Each of the terminal station apparatuses is an optical wavelength multiplex apparatus including an optical cross-connect apparatus. A dummy light source is provided in each of the optical wavelength multiplex apparatus, and dummy light from the dummy light source is inserted into a standby system via the optical cross-connect apparatus.

CITATION LIST

Patent Literature

Patent Literature 1: International Patent Publication No. WO 01/35582
Patent Document 2: Japanese Unexamined Patent Application Publication No. No. 2006-196938

SUMMARY OF INVENTION

Technical Problem

When an optical wavelength multiplex apparatus, which is a terminal station apparatus, inserts dummy light into a standby system, and a reception apparatus detects the dummy light to thereby determine whether the standby system has a failure, the dummy light from a plurality of terminal station apparatuses may enter the reception apparatus depending on the network configuration in the optical wavelength multiplex transmission system. When the dummy light from the plurality of terminal station apparatuses enters the reception apparatus, and a failure occurs at some part of the standby system, the reception apparatus detects the dummy light from the terminal station apparatus connected via a route not passing through the failed part. Thus, the failure occurring in the standby system cannot be detected. More simply, when the dummy light is inserted into the standby system in the terminal station apparatus, which is a transmission station, it is not possible to determine the section of the standby system where a failure is occurring.

An object of the present invention is to provide an optical wavelength multiplex apparatus that employs a redundant configuration composed of an active system and a standby system, identifies a section, and can detect a failure in the standby system, and an optical wavelength multiplex transmission apparatus used in this optical wavelength multiplex transmission system.

An object of the present invention is to provide a standby system checking method for detecting a failure in a standby system in an optical wavelength multiplex transmission system that employs a redundant configuration composed of an active system and a standby system and that is capable of identifying a section and detecting a failure in the standby system.

Solution to Problem

An optical wavelength multiplex transmission system according to the present invention includes a redundant configuration composed of an active system and a standby system between a first terminal station apparatus and a second terminal station apparatus. The first terminal station apparatus includes: a light source configured to output dummy light; a coupler configured to insert the dummy light into the standby system; and a control unit configured to vary the dummy light. The second terminal station apparatus includes: a coupler configured to extract the dummy light from the standby system; and a detector configured to detect the extracted dummy light. The optical wavelength multiplex transmission system can identify a route of the standby system between the first terminal station apparatus and the second terminal station apparatus according to a result of the detection by the detector and check whether the standby system is normal.

An optical wavelength multiplex apparatus according to the present invention is provided in a transmission terminal station in an optical wavelength multiplex transmission system including a redundant configuration composed of an active system and a standby system. The optical wavelength multiplex apparatus includes: a light source configured to output dummy light; a coupler configured to insert the dummy light into the standby system; and a control unit configured to vary the dummy light. The optical wavelength multiplex apparatus can identify a route of the standby system between the transmission terminal station and a reception terminal station according to a result of detection of the dummy light by the reception terminal station and check whether the standby system is normal.

A method for checking a standby system in an optical wavelength multiplex transmission system according to the present invention includes a redundant configuration composed of an active system and a standby system between a first terminal station apparatus and a second terminal station apparatus. The method includes: inserting, in the first terminal station apparatus, varying dummy light into the standby system; extracting, in the second terminal station apparatus, the dummy light from the standby system and detecting it; and identifying a route of the standby system between the first terminal station apparatus and the second terminal station apparatus according to a result of the detection by the second terminal station apparatus and checking whether the standby system is normal.

Advantageous Effects of Invention

According to the present invention, in an optical wavelength multiplex transmission system employing a redundant configuration composed of an active system and a standby system, it is possible to identify a section and detect a failure in the standby system.

DESCRIPTION OF EMBODIMENTS

Figure 1:
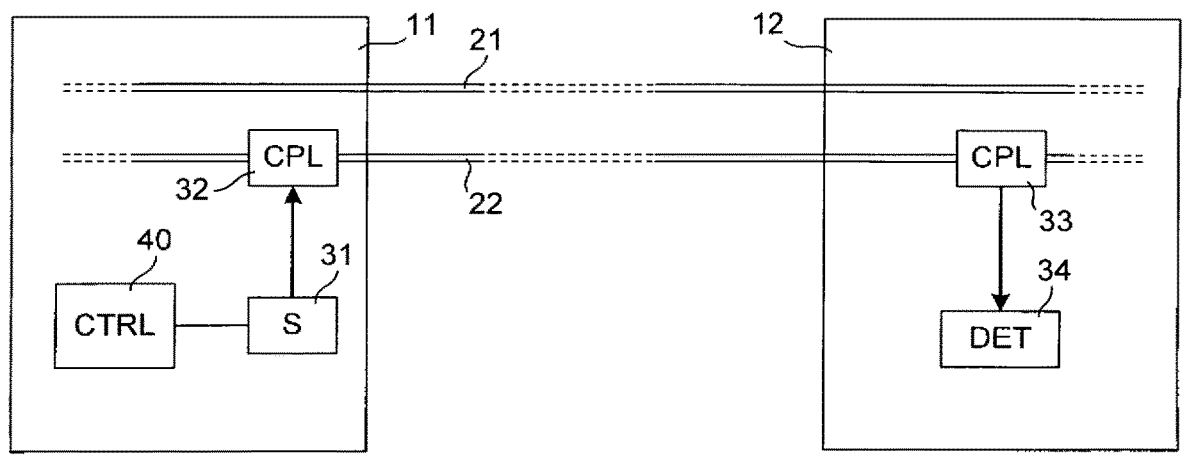
FIG. 1 is a block diagram showing a configuration of an optical wavelength multiplex transmission system according to a first embodiment of the present invention.

Next, preferred embodiments of the present invention will be described with reference to the drawings. FIG. 1 shows a configuration of an optical wavelength multiplex transmission system according to one embodiment of the present invention. In the attached drawings, arrows are used to briefly indicate transmission directions of light or optical signals. However, the use of the arrows does not exclude bidirectional transmission, and in particular, it does not exclude bidirectional transmission in one optical transmission path.

In an optical wavelength multiplex transmission system shown in FIG. 1, two terminal station apparatuses 11 and 12 are connected by optical transmission paths. The optical transmission paths are configured to be redundant by including an active system 21 and a redundant system 22. Optical signals obtained by the optical wavelength division multiplexing (WDM) are transmitted from a first terminal station apparatus 11 to a second terminal station apparatus 12. The first terminal station apparatus 11 transmits the optical signals obtained by the optical wavelength division multiplexing to the optical transmission paths having the redundant configuration. Thus, the first terminal station apparatus 1 is an optical wavelength multiplex apparatus. An optical relay apparatus or an optical splitter apparatus (not shown) may be or may not be provided on the optical transmission paths. The standby system 22 transmits the optical signals on behalf of the active system 21 in the event of a failure in the active system 21. Thus, the standby system 22 needs a transmission wavelength bandwidth sufficient to transmit optical wavelength multiplexed signals having the same number of channels as that used in the active system 21. However, when the required transmission wavelength bandwidth can be included, the wavelength used for transmitting the optical wavelength multiplexed signals may be different between the active system 21 and the standby system 22.

One ends of the optical transmission paths of the active system 21 and the standby system 22 are led into the first terminal station apparatus 11. An optical signal is already transmitted to the active system 21 during a normal operation. The first terminal station apparatus 11 includes a light source (S) 31 that outputs dummy light, a coupler (CPL) 32 that inserts the dummy light into the standby system 22, and a control unit (CTRL) 40 that controls the light source 31 to vary the dummy light. On the other hand, other ends of the optical transmission paths of the active system 21 and the standby system 22 are led into the second terminal station apparatus 12. The second terminal station apparatus 12 includes a coupler 33 that extracts the dummy light from the standby system and a detector (DET) 34 that detects the extracted dummy light. Multiplexed wavelength light having the same wavelength configuration as that of the optical wavelength multiplexed signal (i.e., a main signal) transmitted over the active system 21 may be used as the dummy light or multiplexed wavelength light having a wavelength configuration different from that of the main signal may be used as the dummy light. Further, light having a broad spectral distribution with a wavelength bandwidth similar to that of the main signal may be used as the dummy light instead of the multiplexed wavelength light.

In the optical wavelength multiplex system according to this embodiment, in the first terminal station apparatus 11, the control unit 40 controls the light source 31 to intentionally vary, for example, the intensity of the dummy light. When the dummy light is intentionally controlled in this manner, the dummy light detected by the detector 34 varies accordingly. When the dummy light is varied in the first terminal station apparatus 11 using a varying pattern unique to the first terminal station apparatus 11, it is possible to determine whether the dummy light detected by the detector 34 includes the dummy light from the first terminal station apparatus 11 by comparing the varying pattern of the dummy light detected by the detector 34 with the varying pattern of the first terminal station apparatus 11. Therefore, when the dummy light from a plurality of terminal station apparatuses arrives at the second terminal station apparatus 12 via the standby system 22, it is possible to determine whether the dummy light from the first terminal station apparatus 11 via the standby system 22 arrives at the second terminal station apparatus 12. This makes it possible to identify the route of the standby system 22 between the first terminal station apparatus 11 and the second terminal station apparatus 12 according to a result of the detection by the detector 34. When there is only a single section between the first terminal station apparatus 11 and the second terminal station apparatus 12, the standby system 22 can be confirmed to be normal in this section. For example, a frequency in the intensity variation of the dummy light, and a period and a duration of intermittently generated dummy light may be used as the varying pattern of the dummy light.

As an extension of the optical wavelength multiplex transmission system according to the first embodiment, another terminal station apparatus or an intermediate apparatus that inserts the dummy light into the standby system 22 like the first terminal station apparatus 11 may be connected to the optical transmission path between the first terminal station apparatus 11 and the second terminal station apparatus 12. With the varying patterns of the dummy light different from one another for the respective terminal station apparatuses or the intermediate apparatuses, it is possible to determine the dummy light from which terminal station apparatus or intermediate apparatus has been detected and the dummy light from which terminal station apparatus or intermediate apparatus has not been detected, when the second terminal station apparatus 12 detects the dummy light. When such a terminal station apparatus or an intermediate apparatus is provided in each section of the standby system 22, it is possible to check whether the standby system 22 is normal in each section of the standby system 22. In other words, when a plurality of first terminal station apparatuses are provided in the optical wavelength multiplex transmission system, and these first terminal station apparatuses vary the dummy light with their unique patterns, it is possible to identify which one of the first terminal station apparatuses has generated the dummy light by detecting the unique patterns from the dummy light detected by the second terminal station apparatus 12.

Figure 2:
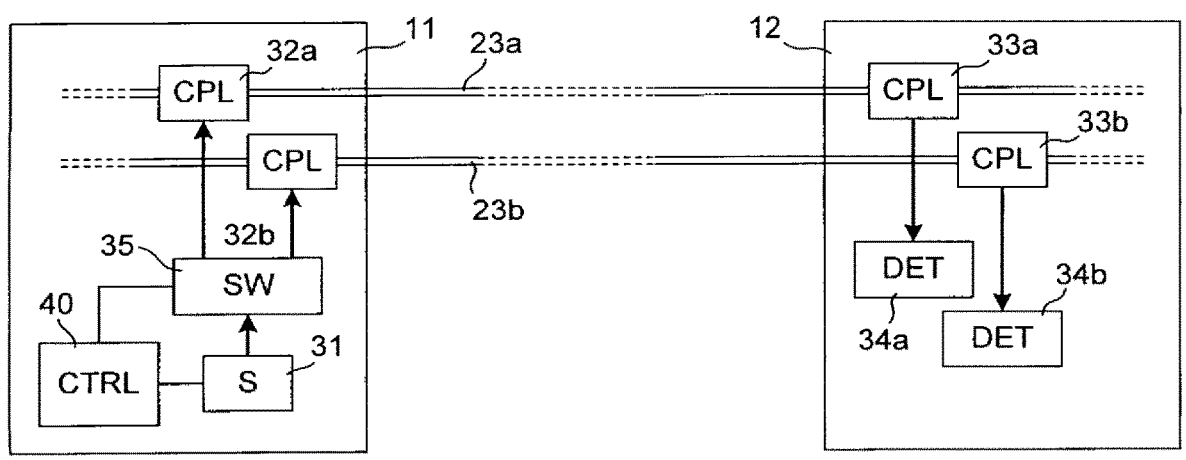
FIG. 2 is a block diagram showing another example of the configuration of the optical wavelength multiplex transmission system according to the first embodiment of the present invention.
Figure 3:
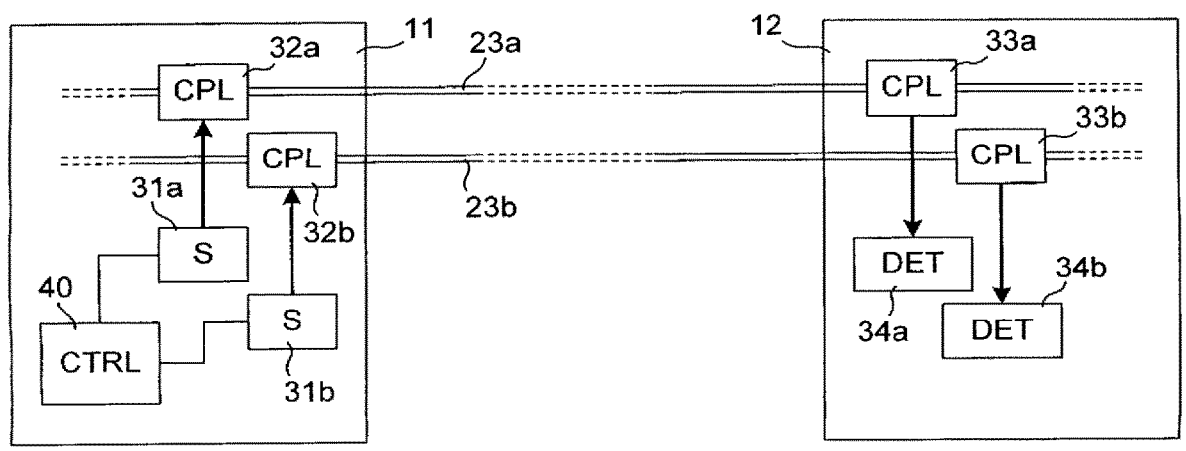
FIG. 3 is a block diagram showing still another example of the configuration of the optical wavelength multiplex transmission system according to the first embodiment of the present invention.

In the optical wavelength multiplex transmission system shown in FIG. 1, one of the optical transmission paths between the first terminal station apparatus 11 and the second terminal station apparatus 12 is fixed to the active system 21, and another optical transmission path is fixed to the standby system 22, and the dummy light is inserted only in the standby system 22. However, in terms of the flexibility of operation of the optical wavelength multiplex transmission system, the active system and the standby system are not preferably fixed among the plurality of optical transmission paths or light. The optical wavelength multiplex transmission system shown in FIGS. 2 and 3 is similar to that shown in FIG. 1 except that a plurality of optical transmission paths between the first terminal station apparatus 11 and the second terminal station apparatus 12 (two optical transmission paths 23a and 23b in the drawings) are switched as specified in such a way that one of the optical switching paths is an active system and another optical transmission path is a standby system. It is thus necessary to be able to switch the optical transmission path into which the dummy light is inserted according to which one of the optical transmission paths is the standby system.

In FIG. 2, in the first terminal station apparatus 11, which is the optical wavelength multiplex apparatus, couplers 32a and 32b for inserting the dummy light are provided for the optical transmission paths 23a and 23b, respectively. A switch (SW) 35 for distributing the dummy light to one of the couplers 32a and 32b is provided between the light source 31 that generates the dummy light and the couplers 32a and 32b. The switch 35 is controlled by the control unit 40. In the second terminal station apparatus 12, couplers 33a and 33b for extracting the dummy light are provided for the optical transmission paths 23a and 23b, respectively, and detectors 34a and 34b for detecting the extracted dummy light are provided for the couplers 33a and 33b, respectively.

In FIG. 3, in the first terminal station apparatus 11, which is the optical wavelength multiplex apparatus, two light sources 31a and 31b for generating the dummy light are provided. The control unit 40 controls which light source is used to generate the dummy light. The couplers 32a and 32b for inserting the dummy light are provided for the optical transmission paths 23a and 23b, respectively, and the light sources 31a and 31b are connected to the couplers 32a and 32b, respectively. The configuration of the second terminal station apparatus 12 in the system shown in FIG. 3 is the same as that shown in FIG. 2.

Next, an optical wavelength multiplex transmission system according to a second embodiment will be described. In the second embodiment, as an example, an optical wavelength multiplex transmission system configured using submarine optical cables will be described. First, an outline of an optical wavelength multiplex transmission system using submarine optical cables will be described prior to the description of the second embodiment. The optical wavelength multiplex transmission system has been widely applied to intercontinental communication and the like. A common method of introducing the optical wavelength multiplex transmission system using the submarine optical cables is that, at the time of the initial introduction, which is when the number of lines used is small, the dummy light is inserted for wavelengths not allocated to lines in order to reduce variations in power when the number of set lines increases. In recent years, flexible light sources combining ASE (Amplified Spontaneous Emission) light source and WSS (Wavelength Selective Switch) have been used. Further, a splitter apparatus of the optical wavelength multiplex transmission system that is submerged at the bottom of the sea is strongly desired to be flexible such as by including functions of a Reconfigurable Optical Add/Drop Multiplexer (ROADM). Studies have been conducted on the introduction of CDC-ROADM including a CDC (Colorless, Directionless and Contentionless) function in the future. The CDC indicates being capable of outputting a specified wavelength (Colorless), being capable of outputting a wavelength in a specified route (Directionless), and having no collision of wavelengths and routes (Contentionless).

Figure 4:
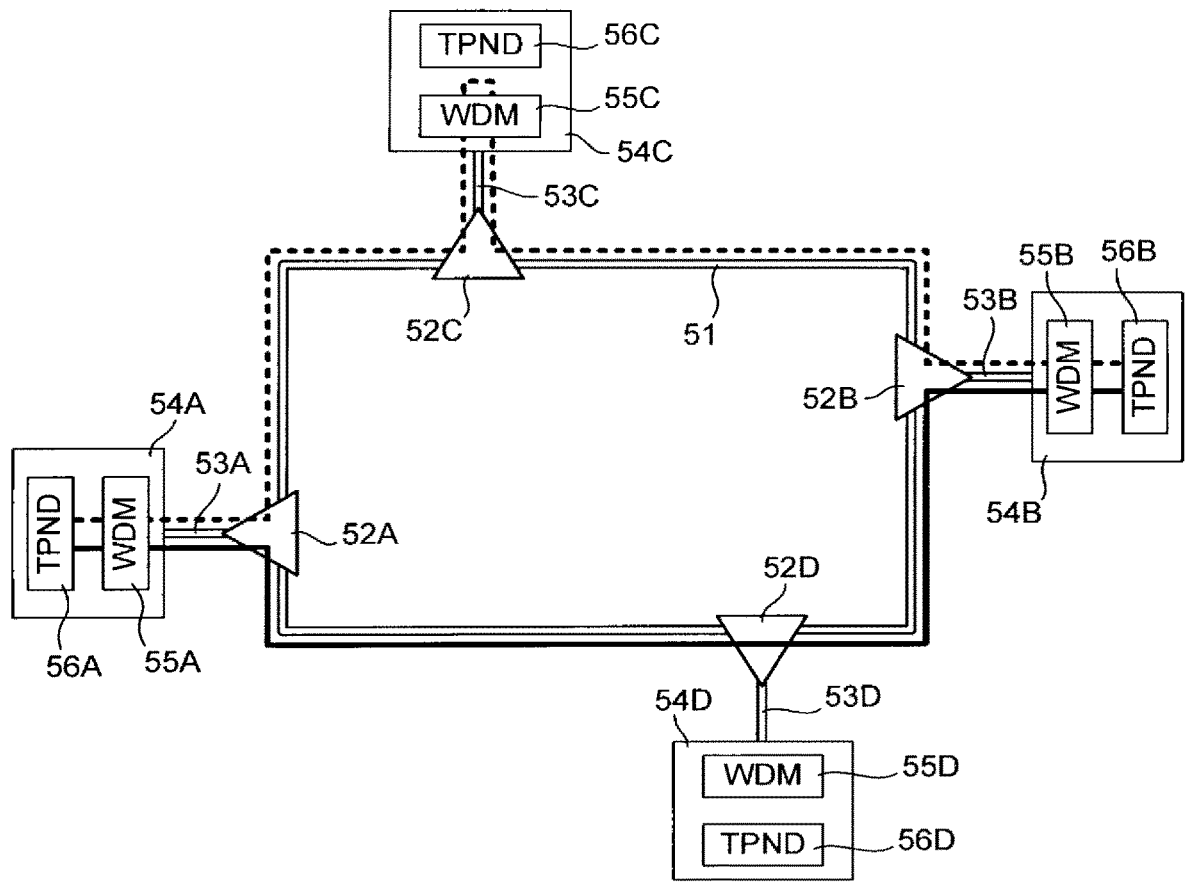
FIG. 4 is a diagram showing a network configuration in an optical wavelength multiplex transmission system according to a second embodiment.

FIG. 4 shows a network configuration of the optical wavelength multiplex transmission system according to the second embodiment. For example, an optical transmission path 51 formed of an optical fiber cable or the like is laid in a ring shape at the bottom of the sea. A plurality of underwater splitter apparatuses installed at the bottom of the sea or the like are provided along the optical transmission path 51. In this example, four underwater splitter apparatuses 52A to 52D are provided. The apparatus including the above-described ROADM function or the apparatus including the CDC-ROADM function is preferable as the underwater splitter apparatuses 52A to 52D. Terminal stations 54A to 54D on land are connected to the underwater splitter apparatuses 52A to 52D via optical transmission paths 53A to 53D for connection made of optical fiber cables and the like, respectively. Optical wavelength multiplex apparatuses 55A to 55D, which are terminal station apparatuses, and terminal station terminators (TPDN; also referred to as transponders) 56A to 56D connected to the optical wavelength multiplexers 55A to 55D are provided in the terminal stations 54A to 54D, respectively. Each of the optical wavelength multiplex apparatuses 55A to 55D uses at least one of the optical transmission paths 51 and 53A to 53D to perform Wavelength Division Multiplexing (WDM) transmission, which employs the redundant configuration composed of an active system and a standby system, with the optical wavelength multiplex apparatus of the terminal station, which is a communication counterpart.

Figure 5:
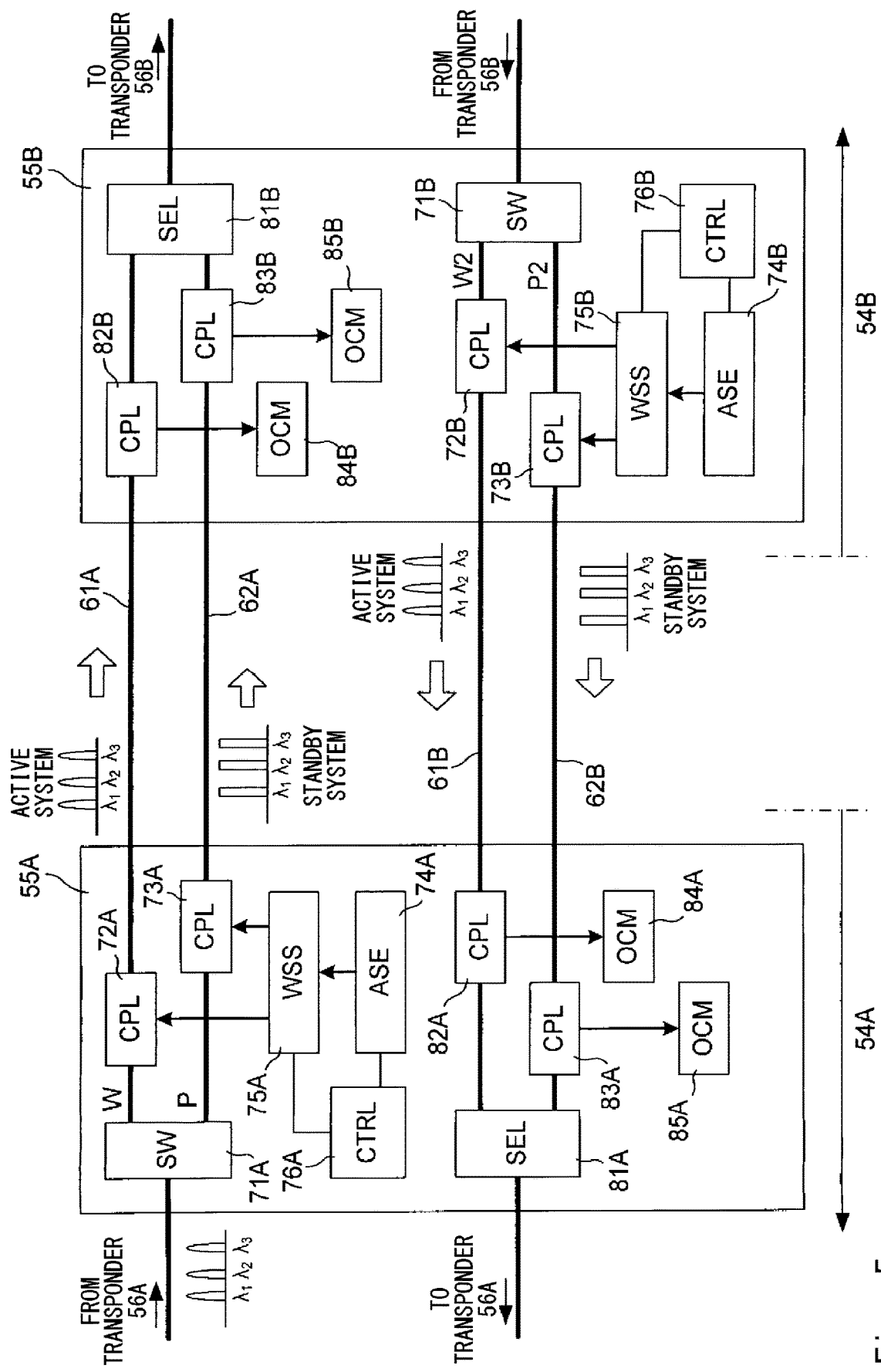
FIG. 5 is a block diagram showing a configuration of the optical wavelength multiplex transmission system according to the second embodiment.

FIG. 5 shows the configurations of the optical wavelength multiplex apparatuses 55A to 55D. The configurations of the optical wavelength multiplex apparatuses 55A to 55D can be the same in all of the terminal stations 54A to 54D. However, both the optical wavelength multiplexer 55A of the terminal station 54A and the optical wavelength multiplexer 55B of the terminal station 54B are shown in order to describe transmission of the optical signals between the terminal stations 54A and 54B. The following description mainly focuses on the transmission when the terminal station 54A is used as a transmission station and the terminal station 54B is used as a reception station.

As can be seen from the network configuration of FIG. 4, there are the following routes between the terminal station 54A and the terminal station 54B. Specifically, a route from the terminal station 54A through the underwater splitter apparatus 52A, the underwater splitter apparatus 52C, and the underwater splitter apparatus 52B to the terminal station 54B, and a route from the terminal station 54A through the underwater splitter apparatus 52A, via the underwater splitter apparatus 52D, and the underwater splitter apparatus 52B to the terminal station 54B. In this embodiment, redundant routes are configured using these two types of routes. The route between the terminal station 54A and the underwater splitter apparatus 52A is configured to be redundant using two physical routes for a multicore optical transmission path for connection 53A. Likewise, the route between the terminal station 54B and the underwater splitter apparatus 52B is configured to be redundant using two physical routes for a multicore optical transmission path for connection 53B.

Thus, two optical lines 61A and 62A from the optical multiplex transmission apparatus 55A to the optical multiplex transmission apparatus 55B are formed, and two optical lines 61B and 62B from the optical multiplex transmission apparatus 55B to the optical multiplex transmission apparatus 55A are formed. In the example shown in FIG. 4, the optical lines of the active system are indicated by thick solid lines and pass through the underwater splitter apparatus 52D. On the other hand, the optical lines of the standby system are indicated by the thick dotted line, pass through the underwater splitter apparatus 52C and turned back at the optical wavelength multiplex apparatus 55C of the terminal station 54C, and again pass through the underwater splitter apparatus 52C to be directed towards the underwater splitter apparatus 52B. In the optical wavelength multiplex transmission system shown in the drawings, there may be a main signal transmitted between the terminal station 54A and the terminal station 54C, and there may be a main signal transmitted between the terminal station 54C and the terminal station 54B. Despite the presence of these main signals, the bandwidth for the standby system for the same number of channels as that of the active system shall be ensured for the terminal stations 54A and 54B.

The optical wavelength multiplex apparatus 55A of the terminal station 54A includes a switch 71A that transmits the optical wavelength multiplexed signal from the transponder 56A to the optical line of the active system, which is one of the optical lines 61A and 62A, couplers 72A and 73A provided for the optical lines 61 and 62, respectively, for inserting the dummy light into the optical lines, an ASE light source (ASE) 74A, a wavelength selective switch (WSS) 75A that selects a wavelength of light from the ASE light source 74A, uses it as the dummy light, and supplies the dummy light to the coupler corresponding to the standby system, which is one of the couplers 72A and 73A, and a control unit 76A that controls the ASE light source 74A and the wavelength selective switch 75A to thereby control the dummy light and further selects the coupler to which the dummy light is transmitted. The switch 71A, the couplers 72A and 73A, the ASE light source 74A, the wavelength selective switch 75A, and the control unit 76A are provided to achieve functions of a transmission station. Further, the optical wavelength multiplex apparatus 55A includes a selector 81A that selects the line of the active system, which is one of the optical lines 61B and 62B, and outputs the optical wavelength multiplexed signal transmitted from the terminal station 54B to the transponder 56A, couplers 82A and 83A that are connected to the optical lines 61B and 62B, respectively, and extract the dummy light from the optical lines 61B and 62B, respectively, and channel monitors (OCM) 84A and 85A that are connected to the couplers 82A and 83A, respectively, and extract the detected light. One of the optical channel monitors 84A and 85A that corresponds to the optical line of the active system monitors the spectrum of the optical wavelength multiplexed signal in the active system. One of the optical channel monitors 84A and 85A that corresponds to the optical line of the standby system detects and monitors the dummy light. The selector 81A, the couplers 82A and 83A, and the optical channel monitors 84A and 85A are provided to achieve functions of a reception station. Like the optical wavelength multiplexing apparatus 55A of the terminal station 54A, the optical wavelength multiplex apparatus 55B of the terminal station 54B includes a switch 71B, couplers 72B, 73B, 82B, 83B, an ASE light source 74B, a wavelength selective switch 75B, a control unit 76B, a selector 81B, and optical channel monitors 84B and 85B.

In a common configuration of a system having a redundant configuration in the related art, light is split in a transmission side and a reception side selects the light. However, an optical wavelength multiplex transmission system using optical wavelength division multiplexing is required to minimize the transmission loss while signals are being transmitted through circuits for the redundant configuration, because it is assumed that the optical wavelength multiplex transmission system is to be used for long distance transmission. Therefore, in the transmission station of the optical wavelength multiplex transmission system shown in FIGS. 4 and 5, the optical wavelength multiplexed signal from the transponder is split by a switch to travel through one of the two optical lines that constitute the redundant configuration, and the dummy light from the ASE light source is transmitted to the other one of the optical lines. Thus, in the normal state, the main signal is transmitted through the optical line of the active system, and the dummy light is inserted into the optical line of the standby system. In the configuration shown in FIG. 5, the optical wavelength multiplexed signal having wavelengths λ1, λ2, and λ3 is input from the transponder 56A to the optical wavelength multiplex apparatus 55A in the terminal station 54A. This optical wavelength multiplexed signal is transmitted as the main signal to the terminal station 54B side through the optical line 61A, which is the active system W at this point. On the other hand, the dummy light having wavelengths λ1, λ2, and λ3 is generated by the ASE light source 74A and the wavelength selective switch 75A. This dummy light is transmitted to the terminal station 54B side through the optical line 62A, which is the standby system P at this point.

When switching from the active system to the standby system is considered, it is preferable to avoid switching carelessly, because another failure may be occurring in the standby system. In the reception station, it is possible to check whether the standby system is normal only by detecting the presence or absence of the dummy light. However, for example, the dummy light of the standby system arriving at the terminal station 54B, which is the reception station, may not be the dummy light generated by the terminal station 54A, which is the transmission station. For example, in the example shown in FIG. 4, the line of the standby system passes through the route of the terminal station 54A→the terminal station 54C→the terminal station 54B. However, when a failure occurs between the terminal A and the terminal 54C, the optical wavelength multiplex apparatus 55C of the terminal station 54C may insert the dummy light into the missing wavelength band in consideration of the influence of the failure on another line from the terminal station 54C to the terminal station 54B. In this case, it is not possible to determine whether the dummy light detected by the terminal station 54B, which is the reception station, is inserted into the terminal station 54A or inserted into the terminal station 54C only by the presence or absence of the dummy light. Therefore, even when the optical line is switched according to a result of the detection by the terminal station 54B, the optical line between the terminal station A and the terminal station B may not recover.

In the optical wavelength multiplex transmission system according to this embodiment, the dummy light generated at the transmission station is varied, for example, the power of the dummy light is varied, and the variation of the dummy light is checked by an optical channel monitor on the reception station side in order to check whether the standby system is normal. Thus, the active system can be switched to the standby system according to a result of the check. The evaluation by the terminal station 54B of whether the dummy light is inserted by the terminal station 54A or the terminal station 54C can be made easy by changing the frequency for varying the intensity of the dummy light to be inserted by the terminal 54A from that by the terminal 54C.

The configuration of this embodiment enables each section of the optical transmission path to be monitored regardless of whether the optical line on the optical transmission path is used even with a complicated configuration of the optical wavelength multiplex transmission system. This makes it possible to monitor the optical line of the standby system, which has not been adequately monitored by the method of the related art, and to smoothly switch from the active system to the standby system, thereby shortening the time taken for recovery in the event of a failure.

The optical wavelength multiplex transmission system according to this embodiment can be modified as described below. For example, in a system using ROADM or the like, the optical wavelength multiplexed signals with different wavelengths can be transmitted through different routes. In such a system, when one route is set for a plurality of wavelengths, the plurality of wavelengths on this route are considered to belong to one group, and one of the wavelengths belonging to this group is selected as a representative wavelength. Then, when the dummy light having the representative wavelength is varied, all the wavelengths belonging to the group are monitored. This eliminates the need to monitor the dummy light for all of the plurality of wavelengths, thereby shortening the time required for the monitoring.

In the above description, the monitoring of the optical lines from the terminal station 54A to the terminal station 54B has been mainly described. However, as a matter of course, this embodiment can be applied to the optical wavelength multiplex transmission system in which the redundant configuration composed of the active system and the standby system is employed in both directions. For example, in the network configuration shown in FIG. 4, when the route that passes through the underwater relay apparatus 52C at the time of transmission from the terminal station 54B to the terminal station 54A is the standby system, and the optical line of the standby system is turned back at the terminal station 54C, as described above, the dummy light having intentionally varied intensity can be inserted into the optical line of the standby system directed toward the terminal station 54C in the terminal station 54B. When the dummy light from the terminal station 54A is varied only when the variation of the dummy light can be normally detected in the terminal station 54A, which is the reception station, the optical lines can be monitored in both directions between the terminal station 54A and the terminal station 54B. In the example shown in FIG. 5, the optical line 61B is used as the active system W2, and the optical line 62B is used as the standby system P2. In the terminal station 54B, the dummy light is inserted into the optical line 62B.

Although the present invention has been described with reference to the embodiments, the present invention is not limited to the above-described embodiments. Various changes that can be understood by those skilled in the art within the scope of the present invention can be made to the configurations and details of the present invention.

The present application is based upon and claims the benefit of priority from Japanese Patent Application No. 2016-065601, filed on Mar. 29, 2016, the entire contents of which are hereby incorporated by reference.

The whole or part of the exemplary embodiments disclosed above can be described as, but not limited to, the following supplementary notes.

Supplementary Note 1

An optical wavelength multiplex transmission system comprising a redundant configuration composed of an active system and a standby system between a first terminal station apparatus and a second terminal station apparatus, wherein
the first terminal station apparatus comprises:
a light source configured to output dummy light;
a first coupler configured to insert the dummy light into the standby system; and
a control unit configured to vary the dummy light,
the second terminal station apparatus comprises:
a second coupler configured to extract the dummy light from the standby system; and
a detector configured to detect the extracted dummy light, and
the optical wavelength multiplex transmission system can identify a route of the standby system between the first terminal station apparatus and the second terminal station apparatus according to a result of the detection by the detector and check whether the standby system is normal.

Supplementary Note 2

An optical wavelength multiplex transmission system comprising a redundant configuration composed of an active system and a standby system using first and second optical lines that are set between a first terminal station apparatus and a second terminal station apparatus, wherein
the first terminal station apparatus comprises:
first and second couplers provided for the first and second optical lines, respectively;
first and second light sources connected to the first and second couplers, respectively, and configured to generate dummy light; and
a control unit configured to operate one of the first and second light sources corresponding to the standby system and control the dummy light from the standby light source to be varied,
the second terminal station apparatus comprises:
third and fourth couplers provided for the first and second optical lines, respectively, and configured to extract the dummy light; and
first and second detectors connected to the third and fourth couplers, respectively, and configured to detect the extracted dummy light, and
the optical wavelength multiplex transmission system can identify a route of the standby system between the first terminal station apparatus and the second terminal station apparatus according to a result of the detection by one of the first and second detectors corresponding to the standby system and check whether the standby system is normal.

Supplementary Note 3

An optical wavelength multiplex transmission system comprising a redundant configuration composed of an active system and a standby system using first and second optical lines that are set between a first terminal station apparatus and a second terminal station apparatus, wherein
the first terminal station apparatus comprises:
first and second couplers provided for the first and second optical lines, respectively;
a light source configured to generate dummy light;
a selective switch configured to select one of the first and second couplers corresponding to the standby system and supply the dummy light to the selected coupler; and
a control unit configured to control the selective switch and vary the dummy light,
the second terminal station apparatus comprises:
third and fourth couplers provided for the first and second optical lines, respectively, and configured to extract the dummy light; and
first and second detectors connected to the third and fourth couplers, respectively, and configured to detect the extracted dummy light, and
the optical wavelength multiplex transmission system can identify a route of the standby system between the first terminal station apparatus and the second terminal station apparatus according to a result of the detection by one of the first and second detectors corresponding to the standby system and check whether the standby system is normal.

Supplementary Note 4

The optical wavelength multiplex transmission system according to Supplementary note 3, wherein the selective switch is a wavelength selective switch.

Supplementary Note 5

The optical wavelength multiplex transmission system according to any one of Supplementary notes 2 to 4, wherein
the first terminal station apparatus comprises a switch that selects one of the first and second optical lines corresponding to the active system and transmits an optical wavelength multiplexed signal to the selected optical line, and
the second terminal station apparatus comprises a selector that selects the optical line corresponding to the active system and extracts the optical wavelength multiplexed signal from the selected optical line.

Supplementary Note 6

The optical wavelength multiplex transmission system according to Supplementary note 5, wherein the dummy light includes light at a plurality of wavelengths identical to a plurality of wavelengths included in the optical wavelength multiplexed signal.

Supplementary Note 7

The optical wavelength multiplex transmission system according to Supplementary note 5, wherein the dummy light is light in a wavelength band that covers the plurality of wavelengths included in the optical wavelength multiplexed signal.

Supplementary Note 8

The optical wavelength multiplex transmission system according to Supplementary note 5, wherein the dummy light is light at one of the plurality of wavelengths included in the optical wavelength multiplexed signal.

Supplementary Note 9

The optical wavelength multiplex transmission system according to any one of Supplementary notes 1 to 8, further comprising a plurality of the first terminal station apparatuses, wherein the control unit varies the dummy light with different patterns for the plurality of the first terminal station apparatuses.

Supplementary Note 10

The optical wavelength multiplex transmission system according to any one of Supplementary notes 1 to 9, wherein the variation of the dummy light is variation of intensity of the dummy light.

Supplementary Note 11

The optical wavelength multiplex transmission system according to any one of Supplementary notes 1 to 10, wherein the light source is an ASE light source.

Supplementary Note 12

An optical multiplex transmission apparatus provided in a transmission terminal station in an optical wavelength multiplex transmission system comprising a redundant configuration composed of an active system and a standby system, the optical wavelength multiplex apparatus comprising:
a light source configured to output dummy light;
a coupler configured to insert the dummy light into the standby system; and
a control unit configured to vary the dummy light, wherein the optical wavelength multiplex apparatus can identify a route of the standby system between the transmission terminal station and a reception terminal station according to a result of detection of the dummy light by the reception terminal station and check whether the standby system is normal.

Supplementary Note 13

An optical multiplex transmission apparatus provided in a transmission terminal station in an optical wavelength multiplex transmission system comprising a redundant configuration composed of an active system and a standby system using first and second optical lines, the optical wavelength multiplex apparatus comprising:
first and second couplers provided for the first and second optical lines, respectively;
first and second light sources connected to the first and second couplers, respectively, and configured to generate dummy light; and
a control unit configured to operate one of the first and second light sources corresponding to the standby system and control the dummy light from the standby light source to be varied, wherein the optical wavelength multiplex apparatus can identify a route of the standby system between the transmission terminal station and a reception terminal station according to a result of detection of the dummy light by the reception terminal station and check whether the standby system is normal.

Supplementary Note 14

An optical multiplex transmission apparatus provided in a transmission terminal station in an optical wavelength multiplex transmission system comprising a redundant configuration composed of an active system and a standby system using first and second optical lines, the optical wavelength multiplex apparatus comprising:
first and second couplers provided for the first and second optical lines, respectively;
a light source configured to generate dummy light;
a selective switch configured to select one of the first and second couplers corresponding to the standby system and supply the dummy light to the selected coupler; and
a control unit configured to control the selective switch and vary the dummy light, wherein the optical wavelength multiplex apparatus can identify a route of the standby system between the transmission terminal station and a reception terminal station according to a result of detection of the dummy light by the reception terminal station and check whether the standby system is normal.

Supplementary Note 15

The optical wavelength multiplex apparatus according to Supplementary note 14, wherein the selective switch is a wavelength selective switch.

Supplementary Note 16

The optical wavelength multiplex apparatus according to any one of Supplementary notes 13 to 15, further comprising a switch that selects one of the first and second optical lines corresponding to the active system and transmits an optical wavelength multiplexed signal to the selected optical line.

Supplementary Note 17

The optical wavelength multiplex apparatus according to Supplementary note 16, wherein the dummy light includes light at a plurality of wavelengths identical to a plurality of wavelengths included in the optical wavelength multiplexed signal.

Supplementary Note 18

The optical wavelength multiplex apparatus according to Supplementary note 16, wherein the dummy light is light in a wavelength band that covers the plurality of wavelengths included in the optical wavelength multiplexed signal.

Supplementary Note 19

The optical wavelength multiplex apparatus according to Supplementary note 16, wherein the dummy light is light at one of the plurality of wavelengths included in the optical wavelength multiplexed signal.

Supplementary Note 20

The optical wavelength multiplex apparatus according to any one of Supplementary notes 12 to 19, wherein the control unit varies the dummy light with a pattern unique to the optical wavelength multiplex apparatus.

Supplementary Note 21

The optical wavelength multiplex transmission apparatus according to any one of Supplementary notes 12 to 20, wherein the variation of the dummy light is variation of intensity of the dummy light.

Supplementary Note 22

The optical wavelength multiplex apparatus according to any one of Supplementary notes 13 to 21, wherein the light source is an ASE light source.

Supplementary Note 23

A method for checking a standby system in an optical wavelength multiplex transmission system comprising a redundant configuration composed of an active system and a standby system between a first terminal station apparatus and a second terminal station apparatus, the method comprising:

inserting, in the first terminal station apparatus, varying dummy light into the standby system;

extracting, in the second terminal station apparatus, the dummy light from the standby system and detecting it; and identifying a route of the standby system between the first terminal station apparatus and the second terminal station apparatus according to a result of the detection by the second terminal station apparatus and checking whether the standby system is normal.

Supplementary Note 24

The method according to Supplementary note 23, wherein the dummy light is varied with a pattern unique to the first terminal station apparatus for each first terminal station apparatus, and the first terminal station apparatus that has generated the detected dummy light is identified by the second terminal station apparatus detecting the unique pattern from the dummy light.

Supplementary Note 25

The method according to Supplementary note 23 or 24, wherein the variation of the dummy light is variation of intensity of the dummy light.

REFERENCE SIGNS LIST 11, 12 TERMINAL STATION APPARATUS
21 ACTIVE SYSTEM
22 STANDBY SYSTEM
23a, 23b, 51, 53A TO 53D OPTICAL TRANSMISSION PATH
31, 31a, 31b LIGHT SOURCE (S)
32, 32a, 32b, 33, 33a, 33b, 72A, 72B, 73A, 73B, 82A, 82B, 83A, 83B COUPLER (CPL)
34, 34a, 34b DETECTOR (DET)
35, 71A, 71B SWITCH (SW)
40, 76A, 76B CONTROL UNIT (CTRL)
54A TO 54D TERMINAL STATION
55A TO 55D OPTICAL WAVELENGTH MULTIPLEX APPARATUS
61A, 61B, 62A, 62B OPTICAL LINE
74A, 74B ASE LIGHT SOURCE (ASE)
75A, 75B WAVELENGTH SELECTIVE SWITCH (WSS)
81A, 81B SELECTOR (SEL)
84A, 84B, 85A, 85B OPTICAL CHANNEL MONITOR (OCM)

What is claimed is:

1. An optical wavelength multiplex transmission system comprising a redundant configuration composed of an active system and a standby system using first and second optical lines that are set between a first terminal station apparatus and a second terminal station apparatus, wherein the first terminal station apparatus comprises:
first and second couplers provided for the first and second optical lines, respectively;
a light source configured to generate dummy light;
a selective switch configured to select one of the first and second couplers corresponding to the standby system and supply the dummy light to the selected coupler; and
a control unit configured to control the selective switch and vary the dummy light, the second terminal station apparatus comprises:
third and fourth couplers provided for the first and second optical lines, respectively, and configured to extract the dummy light; and
first and second detectors connected to the third and fourth couplers, respectively, and configured to detect the extracted dummy light, and the optical wavelength multiplex transmission system can identify a route of the standby system between the first terminal station apparatus and the second terminal station apparatus according to a result of the detection by one of the first and second detectors corresponding to the standby system and check whether the standby system is normal, wherein the selective switch is a wavelength selective switch.

2. The optical wavelength multiplex transmission system according to claim 1, wherein the first terminal station apparatus comprises a switch that selects one of the first and second optical lines corresponding to the active system and transmits an optical wavelength multiplexed signal to the selected optical line, and the second terminal station apparatus comprises a selector that selects the optical line corresponding to the active system and extracts the optical wavelength multiplexed signal from the selected optical line.

3. The optical wavelength multiplex transmission system according to claim 2, wherein the dummy light includes light at a plurality of wavelengths identical to a plurality of wavelengths included in the optical wavelength multiplexed signal.

4. The optical wavelength multiplex transmission system according to claim 2, wherein the dummy light is light in a wavelength band that covers the plurality of wavelengths included in the optical wavelength multiplexed signal.

5. The optical wavelength multiplex transmission system according to claim 2, wherein the dummy light is light at one of the plurality of wavelengths included in the optical wavelength multiplexed signal.

6. The optical wavelength multiplex transmission system according to claim 1, wherein the variation of the dummy light is variation of intensity of the dummy light.

7. An optical wavelength multiplex transmission system comprising a redundant configuration composed of an active system and a standby system using first and second optical lines that are set between a first terminal station apparatus and a second terminal station apparatus, wherein the first terminal station apparatus comprises:
first and second couplers provided for the first and second optical lines, respectively;
a light source configured to generate dummy light;
a selective switch configured to select one of the first and second couplers corresponding to the standby system and supply the dummy light to the selected coupler; and
a control unit configured to control the selective switch and vary the dummy light, the second terminal station apparatus comprises:

third and fourth couplers provided for the first and second optical lines, respectively, and configured to extract the dummy light; and first and second detectors connected to the third and fourth couplers, respectively, and configured to detect the extracted dummy light, and the optical wavelength multiplex transmission system can identify a route of the standby system between the first terminal station apparatus and the second terminal station apparatus according to a result of the detection by one of the first and second detectors corresponding to the standby system and check whether the standby system is normal, further comprising a plurality of the first terminal station apparatuses, wherein the control unit varies the dummy light with different patterns for the plurality of the first terminal station apparatuses.

8. An optical wavelength multiplex transmission system comprising a redundant configuration composed of an active system and a standby system using first and second optical lines that are set between a first terminal station apparatus and a second terminal station apparatus, wherein the first terminal station apparatus comprises:
first and second couplers provided for the first and second optical lines, respectively;
a light source configured to generate dummy light;
a selective switch configured to select one of the first and second couplers corresponding to the standby system and supply the dummy light to the selected coupler; and
a control unit configured to control the selective switch and vary the dummy light, the second terminal station apparatus comprises:
third and fourth couplers provided for the first and second optical lines, respectively, and configured to extract the dummy light; and
first and second detectors connected to the third and fourth couplers, respectively, and configured to detect the extracted dummy light, and the optical wavelength multiplex transmission system can identify a route of the standby system between the first terminal station apparatus and the second terminal station apparatus according to a result of the detection by one of the first and second detectors corresponding to the standby system and check whether the standby system is normal, wherein the light source is an ASE light source.

9. An optical multiplex transmission apparatus provided in a transmission terminal station in an optical wavelength multiplex transmission system comprising a redundant configuration composed of an active system and a standby system using first and second optical lines, the optical wavelength multiplex apparatus comprising:

first and second couplers provided for the first and second optical lines, respectively;
a light source configured to generate dummy light;
a selective switch configured to select one of the first and second couplers corresponding to the standby system and supply the dummy light to the selected coupler; and
a control unit configured to control the selective switch and vary the dummy light, wherein the optical wavelength multiplex apparatus can identify a route of the standby system between the transmission terminal station and a reception terminal station according to a result of detection of the dummy light by the reception terminal station and check whether the standby system is normal, wherein the selective switch is a wavelength selective switch.

10. The optical wavelength multiplex apparatus according to claim 9, further comprising a switch that selects one of the first and second optical lines corresponding to the active system and transmits an optical wavelength multiplexed signal to the selected optical line.

11. The optical wavelength multiplex apparatus according to claim 10, wherein the dummy light includes light at a plurality of wavelengths identical to a plurality of wavelengths included in the optical wavelength multiplexed signal.

12. The optical wavelength multiplex apparatus according to claim 10, wherein the dummy light is light in a wavelength band that covers the plurality of wavelengths included in the optical wavelength multiplexed signal.

13. The optical wavelength multiplex apparatus according to claim 10, wherein the dummy light is light at one of the plurality of wavelengths included in the optical wavelength multiplexed signal.

14. The optical wavelength multiplex apparatus according to claim 9, wherein the control unit varies the dummy light with a pattern unique to the optical wavelength multiplex apparatus.

15. The optical wavelength multiplex transmission apparatus according to claim 9, wherein the variation of the dummy light is variation of intensity of the dummy light.

16. An optical multiplex transmission apparatus provided in a transmission terminal station in an optical wavelength multiplex transmission system comprising a redundant configuration composed of an active system and a standby system using first and second optical lines, the optical wavelength multiplex apparatus comprising:

first and second couplers provided for the first and second optical lines, respectively;
a light source configured to generate dummy light;
a selective switch configured to select one of the first and second couplers corresponding to the standby system and supply the dummy light to the selected coupler; and
a control unit configured to control the selective switch and vary the dummy light, wherein the optical wavelength multiplex apparatus can identify a route of the standby system between the transmission terminal station and a reception terminal station according to a result of detection of the dummy light by the reception terminal station and check whether the standby system is normal, wherein the light source is an ASE light source.

17. A method for checking a standby system in an optical wavelength multiplex transmission system comprising a redundant configuration composed of an active system and a standby system between a first terminal station apparatus, the optical wavelength multiplex transmission system comprising a redundant configuration composed of an active system and a standby system using first and second optical lines that are set between a first terminal station apparatus and a second terminal station apparatus, wherein the first terminal station apparatus comprises:
first and second couplers provided for the first and second optical lines, respectively;
a light source configured to generate dummy light;
a selective switch configured to select one of the first and second couplers corresponding to the standby system and supply the dummy light to the selected coupler; and a control unit configured to control the selective switch and vary the dummy light, the second terminal station apparatus comprises:

third and fourth couplers provided for the first and second optical lines, respectively, and configured to extract the dummy light; and first and second detectors connected to the third and fourth couplers, respectively, and configured to detect the extracted dummy light, and the optical wavelength multiplex transmission system can identify a route of the standby system between the first terminal station apparatus and the second terminal station apparatus according to a result of the detection by one of the first and second detectors corresponding to the standby system and check whether the standby system is normal, wherein the selective switch is a wavelength selective switch;

the method comprising:

inserting, in the first terminal station apparatus, varying dummy light into the standby system;

extracting, in the second terminal station apparatus, the dummy light from the standby system and detecting it; and identifying a route of the standby system between the first terminal station apparatus and the second terminal station apparatus according to a result of the detection by the second terminal station apparatus and checking whether the standby system is normal.

* * * * *